(12) United States Patent
Oroskar et al.

(10) Patent No.: US 8,942,762 B1
(45) Date of Patent: Jan. 27, 2015

(54) ADJUSTMENT OF COMMUNICATION PARAMETERS IN A COVERAGE AREA BASED ON PREVALENCE OF ECSFB DEVICES IN THE COVERAGE AREA

(71) Applicant: Sprint Spectrum L.P., Overland Park, KS (US)

(72) Inventors: Siddharth S. Oroskar, Overland Park, KS (US); Jasinder P. Singh, Olathe, KS (US); Anoop K. Goyal, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 161 days.

(21) Appl. No.: 13/648,919

(22) Filed: Oct. 10, 2012

(51) Int. Cl.
*H04M 3/00* (2006.01)
*H04W 4/00* (2009.01)
*H04W 72/00* (2009.01)
*H04W 68/00* (2009.01)
*H04B 7/00* (2006.01)
*H04M 1/00* (2006.01)
*H04L 12/66* (2006.01)

(52) U.S. Cl.
USPC .................. 455/552.1; 455/418; 455/422.1; 455/453; 455/458; 455/515; 370/352

(58) Field of Classification Search
CPC ......... H04W 4/00; H04W 8/26; H04W 16/04; H04W 16/00; H04W 16/02; H04W 16/06; H04W 16/08; H04W 24/00; H04W 28/00; H04W 28/02; H04W 28/08; H04W 74/00; H04W 92/02; H04W 92/04; H04W 92/00; H04W 76/00

USPC .............. 455/418–420, 422.1, 423–425, 450, 455/452.1–452.2, 453, 509, 524–525, 455/550.1, 552.1, 556.2, 560–561, 404.2, 455/426.1, 456.1–456.3, 456.5–456.6, 458, 455/515; 370/252, 328–329, 338, 341, 370/216–221, 331–332, 352–357
See application file for complete search history.

(56) References Cited

U.S. PATENT DOCUMENTS

| | | | |
|---|---|---|---|
| 8,611,897 B2 * | 12/2013 | Pudhey et al. | 455/434 |
| 8,682,357 B2 | 3/2014 | Worrall | |
| 8,706,122 B2 * | 4/2014 | Vikberg et al. | 455/445 |
| 2008/0254814 A1 | 10/2008 | Harris et al. | |
| 2011/0149907 A1 * | 6/2011 | Olsson et al. | 370/331 |
| 2011/0158165 A1 * | 6/2011 | Dwyer et al. | 370/328 |
| 2011/0195714 A1 | 8/2011 | Sawinathan | |
| 2011/0286427 A1 * | 11/2011 | Shirota et al. | 370/331 |
| 2012/0028661 A1 * | 2/2012 | Fang et al. | 455/466 |
| 2012/0115489 A1 * | 5/2012 | Shuai et al. | 455/438 |
| 2012/0122459 A1 * | 5/2012 | Wu et al. | 455/437 |

* cited by examiner

*Primary Examiner* — Meless Zewdu

(57) ABSTRACT

Disclosed herein are methods and systems that may help to adjust, e.g., CDMA paging and access parameters in a coverage area, based on the prevalence of devices that are configured for enhanced circuit switch fallback (eCSFB) in the coverage area. For example, a base station in a radio access network (RAN) may: (a) determine a measure CSFB-device prevalence in a coverage area, (b) use the measure of CSFB-device prevalence in the coverage area as a basis for adjusting one or more parameters for communications with via a first channel (e.g., a CDMA paging or access channel), and (c) apply the one or more adjusted parameters to communications with devices via the first channel.

25 Claims, 5 Drawing Sheets

ADJUSTMENT OF COMMUNICATION PARAMETERS IN A COVERAGE AREA BASED ON PREVALENCE OF ECSFB DEVICES IN THE COVERAGE AREA

BACKGROUND

To provide cellular wireless communication service, a wireless service provider or "wireless carrier" typically operates a radio access network (RAN) that defines one or more coverage areas in which WCDs can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), Long-Term Evolution (LTE), TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

OVERVIEW

In networks that provide service under both Long-Term Evolution (LTE) and an older CDMA protocol (e.g., IS-2000 and/or IS-856), service providers may implement circuit switch fallback (CSFB) and/or enhanced circuit switch fallback (eCSFB) functionality, which allow service providers to use their older existing CDMA network for voice calls, while at the same time using LTE to support mobile broadband.

Under CSFB, a wireless communication device may, by default, operate with its CDMA receiver powered down, and only listen for pages via an LTE paging channel. Thus, when a radio access network (RAN) needs to page a wireless communication device for a voice call, the RAN may first page the wireless communication device via an LTE paging channel. This indicates to the wireless communication device that it should turn on its CDMA receiver and listen to the CDMA paging channel for a page. The RAN can then send the page via the CDMA paging channel. Thus, a wireless communication device operating under CSFB may keep its CDMA receiver powered down, except when it is about to receive a page via the CDMA paging channel.

When eCSFB is implemented, a RAN may generally use its 3G traffic channels for voice calls and 1x-data calls, while using LTE signaling channels for most or possibly even all other signaling functions. As a result, a base station that implements eCSFB may use the LTE control channel for both LTE control channel messages and CDMA control-channel message. Similarly, the base station may use the LTE paging channel for all LTE and CDMA paging-channel messages (e.g., paging, call origination, SMS, feature notification, and other overhead messages), whenever the device with which it is communicating is compatible with such functionality. Configured as such, the base station does not use the CDMA paging and access channels for devices that are operable for eCSFB (referred to herein as "non-eCSFB" devices). Thus, the base station only reverts (e.g., "falls back") to using the CDMA paging and access channels for CDMA communicating with non-CSFB devices.

Note that there may be LTE-capable devices that are not configured for eCSFB, and thus do not know to listen to the LTE paging channel for CDMA pages. As such, a RAN may refrain from implementing eCSFB for such devices, and CDMA pages thus be sent to such devices via the CDMA paging channel.

Herein, wireless communication devices (WCDs) that are capable of LTE communications, and thus capable of operating according to eCSFB, may be referred to as "CSFB devices" or "eCSFB WCDs." On the other hand, WCDs that are not capable of LTE communications and thus utilize CDMA paging and access channels, may be referred to herein as "non-CSFB devices" or "non-eCSFB WCDs."

As the number of CSFB devices increases, both the CDMA paging channel occupancy (PCO) and the access channel occupancy (ACO) may decrease due to reduced usage of the paging channel and access channel. Accordingly, exemplary embodiments may help take advantage of such reduced paging- and access-channel usage in an effort to improve the service provided to non-CSFB devices. For instance, when a higher number or percentage of CSFB devices is detected, paging parameters for a sector's CDMA paging channel may be adjusted so as to increase the paging success rate (PSR) via the CDMA paging channel. Such adjustments may also increase the PCO for the CDMA paging channel, but the increased PCO may be offset at least partially by the increased presence of CSFB devices and the reduction to the PCO for the CDMA paging channel to which the presence of CSFB device corresponds.

In one aspect, an exemplary method involves a base station in a RAN: (a) determining a measure of enhanced circuit switch fallback (eCSFB) device prevalence in a coverage area, wherein the RAN is configured to use a first channel defined under a first air-interface protocol for a given type of communication with non-CSFB devices, and wherein the RAN is further configured to use a second channel defined under a second air-interface protocol for the given type of communication with CSFB devices; (b) using the measure of CSFB-device prevalence in the coverage area as a basis for adjusting one or more parameters for communications with via the first channel; and (c) applying the one or more adjusted parameters to communications with devices via the first channel.

In another aspect, a non-transitory computer readable medium may have stored therein instructions that are executable to cause a RAN to perform functions comprising: (a) determining a measure of enhanced circuit switch fallback (eCSFB) device prevalence in a coverage area, wherein the RAN is configured to use a first channel defined under a first air-interface protocol for a given type of communication with non-CSFB devices, and wherein the RAN is further configured to use a second channel defined under a second air-interface protocol for the given type of communication with CSFB devices; (b) using the measure of CSFB-device prevalence in the coverage area as a basis for adjusting one or more parameters for communications with via the first channel; and (c) applying the one or more adjusted parameters to communications with devices via the first channel that is defined under the first air-interface protocol.

In a further aspect, a RAN component may include a non-transitory computer readable medium and program instructions stored on the non-transitory computer readable medium. The program instructions may be executable by at least one processor to: (a) determine a measure of enhanced circuit switch fallback (eCSFB) device prevalence in a coverage area, wherein the RAN is configured to use a first channel defined under a first air-interface protocol for a given type of communication with non-CSFB devices, and wherein the RAN is further configured to use a second channel defined under a second air-interface protocol for the given type of communication with CSFB devices; (b) use the measure of CSFB-device prevalence in the coverage area as a basis to adjust one or more parameters for communications with via the first channel; and (c) apply the one or more adjusted parameters to communications with devices via the first channel that is defined under the first air-interface protocol.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. EXEMPLARY NETWORK SYSTEMS

Figure 1:
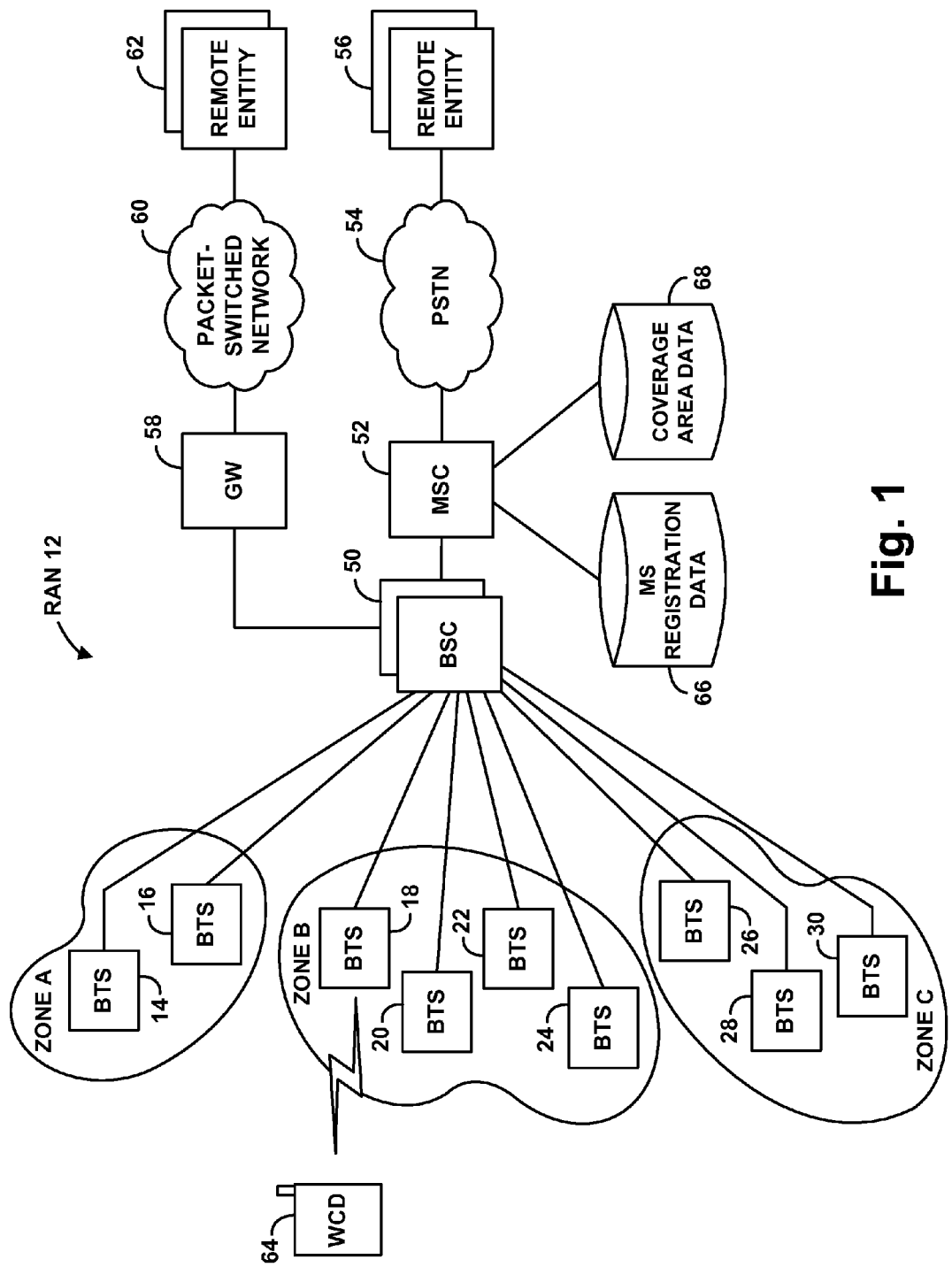
FIG. 1 is a block diagram illustrating a wireless communication network, according to an exemplary embodiment.

Referring to the Figures, FIG. 1 is a block diagram illustrating a wireless communication network, according to an exemplary embodiment. As noted, service providers may implement networks in which service is provided under a CDMA standard (e.g., IS-95, IS-2000, 1xRTT, 1xEV-DO, etc.) as well as under a 4G protocol such as LTE and/or WiMax. Service under both CDMA and LTE (or WiMAX) may be implemented in conjunction with the arrangement shown in FIG. 1, and more specific details of a network with overlapping CDMA and LTE will be discussed in reference to FIG. 2.

As shown in FIG. 1, an exemplary network may include a radio access network (RAN) 12 that radiates to define numerous coverage areas in which wireless communication devices (WCDs) can engage in RF communication with the RAN. Herein, WCDs may also be referred to as "mobile stations," as is common when referring to WCDs in the context of a CDMA network, and also as "user entities" (UEs), as is common when referring to WCDs in the context of an LTE network. Thus, the terms "mobile station," "wireless communication device" (or WCD), and "user entity" (or UE) may be used interchangeably herein. Further, a WCD may be classified herein based on whether or not it is configured for circuit-switched fallback (CSFB) and/or enhanced circuit-switched fallback (eCSFB) functionality, and thus may be referred to as either an "CSFB device" or a "non-CSFB device."

The RAN 12 may define these coverage areas discretely through use of directional antennas and/or by various modulation parameters, including, without limitation, carrier frequencies, PN offsets, and/or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include one or more base stations (also referred to as "base transceiver stations" (BTSs)), designated in the figure as base stations 14-30, and one or more base station controllers (BSCs) 50 (which may be integrated with or separate entities from the one or more of the base stations). The base stations preferably include directional antennas, power amplifiers, and associated transceiver equipment arranged to establish corresponding wireless coverage areas and to communicate with WCDs in those coverage areas.

The coverage areas served by base stations 14-30 may be cell sectors, or some other defined wireless coverage area (possibly even a combination of coverage provided by multiple base stations). Each base station 14-30 may serve a single coverage area (e.g., a single cell or sector), or may serve multiple discrete coverage areas, such as multiple sectors, for instance.

Each base station controller may be coupled with one or more switches, such as a mobile switching center (MSC) 52, which provides connectivity with the public switched telephone network (PSTN) 54, so that served WCDs can communicate with remote entities 56 on the PTSN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

Note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

FIG. 1 depicts a representative WCD 64 by way of example, which could be a cell phone, tablet, laptop computer, wirelessly equipped personal digital assistant (PDA), personal computer, home electronic device, or any other type of wirelessly-equipped device now known or later developed. The WCD 64 is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above.

Further, a WCD 64 may include a user interface, which typically includes components for receiving input from a user of a WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Note that when referring to a CDMA network, wireless communication devices (WCDs) may often be referred to as "mobile stations." In other protocols, WCDs may be referred to using different terminology. For example, under LTE, WCDs may be referred to as "user entities" (UEs).

Each mobile station, such as WCD 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN).

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

Figure 2:
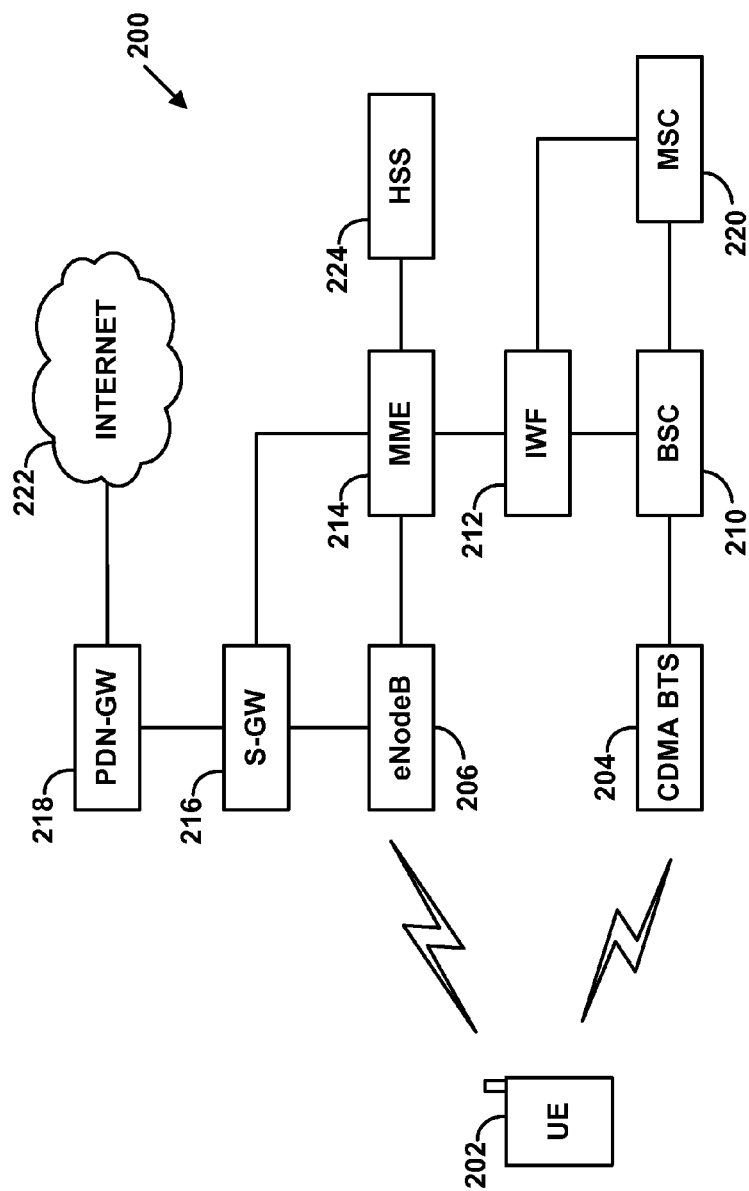
FIG. 2 is a simplified block diagram of a wireless communication network in which a service provider supports wireless service under two or more different air interface protocols, according to an exemplary embodiment.

As noted above, FIG. 2 is a simplified block diagram of a wireless communication network 200 in which a service provider supports wireless service under two or more different air interface protocols. In particular, FIG. 2 shows an exemplary RAN that is configured to provide service under both CDMA and LTE. As such, a UE 202 operating in network 200 may connect and communicate under different air-interface protocols, such as CDMA and LTE. In practice, network 200 may include two or more separate access networks with overlapping coverage areas (e.g., separate access network for LTE and CDMA). Alternatively, some or all components may be combined so as to support both CDMA and LTE communications, for example.

In the illustrated configuration, network 200 includes components to provide for CDMA communications. Specifically, FIG. 2 shows a BTS 204, a BSC 210, and an MSC 220, which collectively (and possibly in conjunction with other components that help to provide service under CDMA) may be referred to as a CDMA network. Note that BTS 204, BSC 210, and MSC 220 may be configured for the same or similar functions as BTSs 14-30, BSC 50, and MSC 52, which were described in reference to FIG. 1.

Network 200 also includes components to provide a UE 202 with service under LTE. In particular, network 200 includes one or more eNodeBs 206, which are base stations configured to support over-the-air communications with UEs 202 under LTE. Each eNodeB 206 may provide service under LTE in one or more coverage areas, such as a cell or one or more cell-sectors.

To support LTE communications, network 200 also includes a mobility management entity (MME) 214, which may be configured to control communications between one or more eNodeBs 206 and a serving gateway (S-GW) 216. MME 28 may also be communicatively coupled to a home subscriber server (HSS) 224, which stores subscriber information, such as information related to UE 202. More generally, an MME 214 may support functionality such as mobility management, bearer management, paging-message distribution, security functions, authentication of UEs, gateway selection for communications, and so on.

In an exemplary configuration, S-GW 216 may be configured to communicate with one or more eNodBs 206 and/or with MME 214 in order to provide various functions such as packet routing and forwarding, mobility anchoring, packet buffering, and so on. For instance, S-GW 216 may provide packet routing for LTE communications to and/or from UE 202. Yet further, an LTE access network may include a packet data network gateway (PDN-GW) 218, which facilitates packet-data communications between an S-GW 216 that operates according to LTE, and a packet-data network, such as the Internet 222.

In a further aspect, network 200 includes an interworking function (IWF) 212, which may be a functional component of the network that supports interworking between different wireless technologies, such as CDMA and LTE. In an exemplary configuration, IWF 212 may support communications between components of an LTE network (e.g., MME 214) and components of a CDMA network (e.g., BSC 210 and/or MSC 220), so that a service provider may implement circuit-switched fallback (CSFB) or enhanced circuit-switched fallback (eCSFB) functionality.

CSFB and eCSFB may allow a service provider to deliver voice-services to a UE 202, and/or to provide data provide data services under a CDMA protocol to UE 202, which is not configured for LTE communications. The LTE network and the CDMA network (e.g., the fall back network) may be connected via a tunnel, such as IWF 212.

A UE 202 that is configured for CSFB or eCSFB may register with the CDMA-portion of network 200 via an LTE access channel. More specifically when a UE 202 connects to a LTE network via an eNodeB 206, it can communicate with a CDMA MSC 220 through an IWF 212, which functions to bridge the LTE and CDM networks, encapsulate and relay CDMA messages between the UE 202 and the MSC 220. For example, a UE 202 may send CDMA messages via an eNodeB 206 and an MME 214. The IWF 212 may then encapsulate and relay such CDMA messages to MSC 220.

Further, a UE 202 that is configured for eCSFB may use an LTE access channel to initiate a voice call under CDMA. For instance, when a CSFB device requests to initiate a voice call via an LTE access channel, the LTE network may then notify the CDMA network of the voice call via the bridge provided by IWF 212, so that the call may be established via the CDMA network. For example, MME 214 may notify MSC 220 of UE 202's request to initiate a voice call via IWF 212, so that MSC 220 may reserve CDMA resources for the call.

Yet further, under eCSFB, all paging functionality for both CDMA and LTE communications may be carried out via the LTE paging channel, unless the target UE of the paged is not configured for eCSFB, in which case the CDMA paging channel is used instead. Thus, if most of UEs in a certain geographic area are configured for eCSFB, the number of paging-channel messages being sent via the CDMA paging channel may be significantly reduced.

In another aspect of eCSFB, UEs 202 that are configured for eCSFB may search for an LTE pilot signal first, and only search for a CDMA pilot signal when an LTE pilot signal is unavailable. In addition, eCSFB UEs may use the LTE access channels for all access functionality, such as sending access probes, unless LTE is unavailable. Therefore, if most of UEs 30 in a certain geographic area are configured for eCSFB, the number of access probes being sent via a CDMA paging channel may be significantly reduced. Advantageously, such eCSFB functionality may help a UE 30 to conserve power. In particular, rather than simultaneously using two wireless communication interfaces (e.g., one for LTE communications and one for CDMA communications), eCSFB may allow a UE 202 to turn its CDMA communication interface off at most times.

It should be understood that the network arrangements shown in FIGS. 1 and 2 and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

A. CDMA Paging

In a RAN that is configured for eCSFB, the RAN may still use the CDMA paging channel to page a WCD that is not capable of LTE communications, and/or that is not configured for eCSFB, and thus does not know to listen to the LTE paging channel for both CDMA and LTE pages. Accordingly, a more detailed explanation of CDMA paging is provided below.

Under CDMA, when a RAN seeks to communicate with a WCD (e.g., to establish an incoming voice call or transmit incoming packet data to a WCD), the RAN may first page the WCD on a CDMA paging channel. The purpose of paging the WCD may be to determine whether the WCD is still within range of a preferred wireless coverage area, and if so, to notify the WCD of the incoming communication. If the WCD is successfully paged, the RAN may assign one or more traffic channels to WCD.

The paging channel may operate in a slotted manner, according to time-division multiplexing (TDM), and multiple WCDs may be grouped together and assigned to the same paging channel slot. Each paging channel slot is typically divided into four frames, each of which comprises two half-frames, resulting in a total of eight half-frames per paging channel slot. In a given paging channel slot, the RAN may transmit one or more general paging messages (GPMs), each containing information sufficient to identify which WCD or WCDs of the group (if any) are being paged. Thus, a WCD served by a given wireless coverage area may periodically listen to its assigned paging channel slot to determine whether the RAN is seeking to page the WCD.

Paging is typically initiated when an MSC receives an indication that a WCD should be paged (e.g., an incoming call), or when the MSC itself determines that a WCD should be paged. The indication normally includes a WCD identifier, such as a Network Access Identifier (NAI), a Mobile Directory Number (MDN), a Mobile Identification Number (MIN), an International Mobile Subscriber Identifier (IMSI), an electronic serial number (ESN), and/or a mobile equipment identifier (MEID). The MSC may then transmit some representation of the indication to the appropriate BTS or BTSs.

In turn, the BTS may use the WCD identifier to generate a page record, which the BTS may then place in a GPM for transmission to the WCD. (A GPM may also be referred to as a "page-request message" or just a "page.") The WCD may then reply with to the BTS with a page-response message (PRM) sent via a reverse-link access channel. After receiving the PRM and verifying the page was successfully received, the RAN may then assign one or more traffic channels to the WCD.

In an example embodiment, a base station may be configured to create a general page message (GPM) that includes multiple paging-channel messages, such that multiple mobile stations can be paged using a single page message. (For clarity, each individual page to a mobile station that is included in a larger "general page message" (or GPM) may be referred to as a "page record" or "paging-channel message.") Before transmission, page records may be concatenated so that more page records may be included in a GPM than otherwise could be. For example, in some implementations, one concatenation level may correspond to concatenation that allows up to eight page records to be concatenated in a single GPM. Additionally or alternatively, other concatenation levels may correspond to concatenation of pages in a GPM such that at least five page records may be included in a single GPM.

Without concatenation, a single CDMA page message that occupies two half frames in the paging channel, typically does not include more than four page records. In comparison, when concatenation according to one example concatenation level is applied, a GPM may include two page records that are concatenated such that the GPM can be sent in two to three half frames. This concatenation level may thus allow for five page records to be sent in a single timeslot. Another possible concatenation level may allow for two to eight page records to be concatenated in a GPM that is sent in two half frames, which in turn may allow a base station to transmit eight page records in a timeslot. Other levels of concatenation are also possible.

When multiple page records are concatenated in a GPM, some information that is typically included in a page record may not be repeated for each page record in the GPM. For example, length bits, overhead bits, CRC bits, and reserved bits, are not typically repeated for each page record in a GPM. Thus, while concatenating page records into a GPM may reduce the load on the CDMA paging channel, thereby helping to reduce the CDMA paging-channel occupancy (PCO), concatenation may also result in some page records failing to reach their intended mobile stations, thus reducing the paging-success rate (PSR) under CDMA.

In a further aspect of CDMA paging, a RAN may resend a page when a page fails to reach (or seemingly fails to reach) a WCD; possibly making multiple attempts. More specifically, when a RAN does not receive a PRM from a WCD, the base station may attempt to re-page the WCD. In particular, a base station may wait a predetermined period of time (ten seconds, for instance) to receive a PRM. If the base station does not receive such an indication, the base station will resend to the WCD. The base station typically repeats this process until a PRM indicates that the page was successfully received, or until a maximum number of attempts has been made without receiving a PRM, and the page is therefore deemed to have failed.

In an exemplary embodiment, a base station may have various paging-scheme settings that affect the manner in which the switch resends a page. In particular, the base station may define a "maximum-attempt" parameter, the value of which indicates the maximum number of attempts that can be made to send a given page. Further, the base station may track the "paging-attempt status" of a given page; which may also be referred to as the base station's "attempt count" for the page (i.e., how many attempts have been made by the switch to send the page). For example, a base station may include, maintain, or have access to a database that tracks the paging-attempt status of pages initiated by the base station. As such, when a page is successfully received at the intended WCD, and a PRM is received at the base station from which the page was sent, the base station (and its serving switch) may then know not to initiate additional attempts to send the page. On the other hand, if the base station does not receive a PRM indicating that a page attempt was successful, the base station and/or its serving switch may check the paging-attempt status, and if appropriate, make an additional attempt to send the page to the WCD.

In addition, the base station may implement a "page-attempt timer," which the base station uses to determine when to make a subsequent paging attempt. Accordingly, if additional attempts to send the page are possible after the base station makes an attempt to send a page (e.g., if the attempt count for the page is less than the maximum-attempt value), the base station may start the page-attempt timer when it makes the attempt. Then, if no acknowledgement has been received from the WCD when the page-attempt timer expires, the base station may initiate the next attempt to send the page.

B. CDMA Access Functionality

Referring back to FIG. 1, when a WCD 64 seeks to, as examples, originate a CDMA communication session (e.g. a voice call) or respond to a CDMA page message from a base station, the mobile station may send one or more messages known as access probes to the base station over a reverse-link CDMA access channel. As part of this process, the mobile station determines a transmit power level at which to send communications to the base station.

To arrive at an appropriate transmit power for communications, a WCD 64 typically determines an initial power level at which to send an initial access probe, and then transmits the access probe. If the base station (e.g., a BTS 14-30) does not acknowledge the initial access probe, the WCD 64 then retransmits the access probe at an incrementally higher power level (e.g., 3 dB higher than the previous access probe). The WCD 64 repeats this process (i.e., incrementally increasing the power level and re-transmitting) until either receiving an acknowledgement from the base station or reaching a set number (e.g., five) of transmitted access probes. The WCD 64 may then wait a timeout period, and start again at the initial power level. The mobile station may repeat this entire cycle a set number of times (e.g., three) before concluding that the base station is not reachable, or perhaps waiting a longer timeout period before starting the entire sequence over. (It should be noted that variations on this access-probe-sending sequence exist as well, as this description is merely an example.)

Herein, the initial power level used for the initial attempt to send an access probe may be referred to herein as the "initial transmit power." The amount by which a WCD 64 increases its transmit power upon each successive attempt in an access-probe cycle may be referred to herein as the "probe-power increase amount." Furthermore, the power level that is ultimately determined to be appropriate for reverse-link communications (e.g., the transmit power used to send the access probe when an acknowledgement approving the transmit power is received from the base station), is referred to herein as the "verified transmit power."

Further, as used herein, the "maximum probe number" may refer to the maximum number of access probes that a WCD 64 (or UE 202) can send in each access-probe cycle. Yet further, the "maximum cycle number," as used herein, may refer to the maximum number of times a given WCD 64 (or UE 202) may repeat the access-probe cycle described above. In addition, the term "access-probe timer" may be used herein to refer to a timer that specifies the period of time that a WCD 64 (or UE 202) waits between attempts to send an access-probe during a given access-probe cycle.

II. EXEMPLARY RAN COMPONENTS

Figure 3:
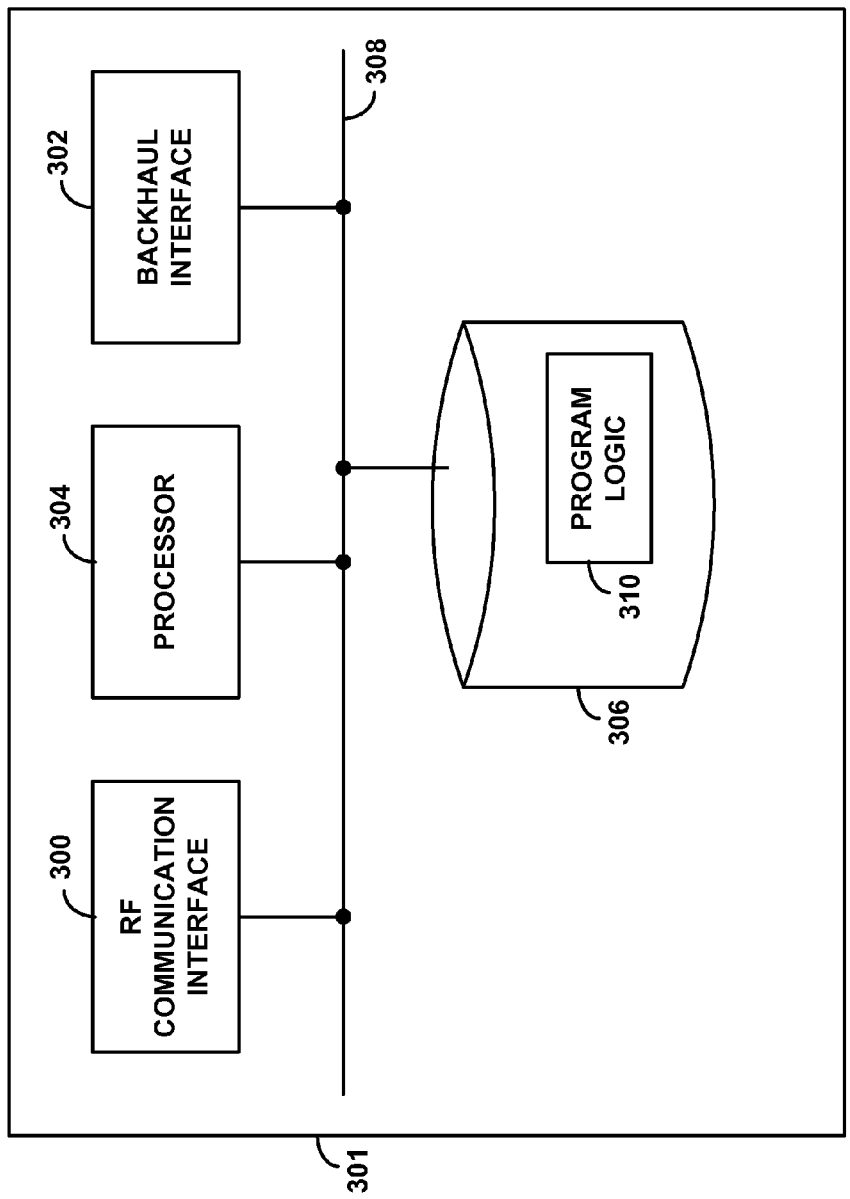
FIG. 3 is a simplified block diagram exemplifying a RAN component, according to an exemplary embodiment.

FIG. 3 is a simplified block diagram exemplifying a RAN component, according to an exemplary embodiment. In particular, FIG. 3 illustrates some of the functional components that would likely be found in a RAN component 301 arranged to operate in accordance with the embodiments herein. As shown, the RAN component 301 may include an RF communication interface 300, a backhaul interface 302, a processor 304, and data storage 306, all of which may be communicatively linked together by a system bus, network, or one or more other connection mechanisms 308.

In practice, RAN component 301 may take the form of or include one or more BTS and/or a BSC, such as BTSs 18-24 and/or BSC 50 for instance, or may take the form of a switch, such as MSC 52. Accordingly, the illustrated components of RAN component 301 (e.g., communication interface 300, a backhaul interface 302, a processor 304, and data storage 306) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

In RAN component 301, RF communication interface 300 may comprise one or more antenna structures, one or more power amplifiers, and associated equipment, for engaging in RF communication with mobile stations operating within the base station's coverage, according to one of the air interface protocols noted above for instance. Backhaul interface 302 may comprise any sort of communication link or mechanism enabling the base station to exchange signaling and bearer data with other RAN entities, such as with MSC 52 for instance. Processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functionality of the exemplary methods and systems described herein.

In an exemplary embodiment, data storage 306 may include program instructions that are executable by processor 304 to: (a) determine a measure of enhanced circuit switch fallback (eCSFB) device prevalence in a coverage area, wherein the RAN is configured to use a first channel defined under a first air-interface protocol for a given type of communication with non-CSFB devices, and wherein the RAN is further configured to use a second channel defined under a second air-interface protocol for the given type of communication with CSFB devices, (b) use the measure of CSFB-device prevalence in the coverage area as a basis to adjust one or more parameters for communications with via the first channel, and (c) apply the one or more adjusted parameters to communications with devices via the first channel that is defined under the first air-interface protocol.

III. EXEMPLARY METHOD

Figure 4:
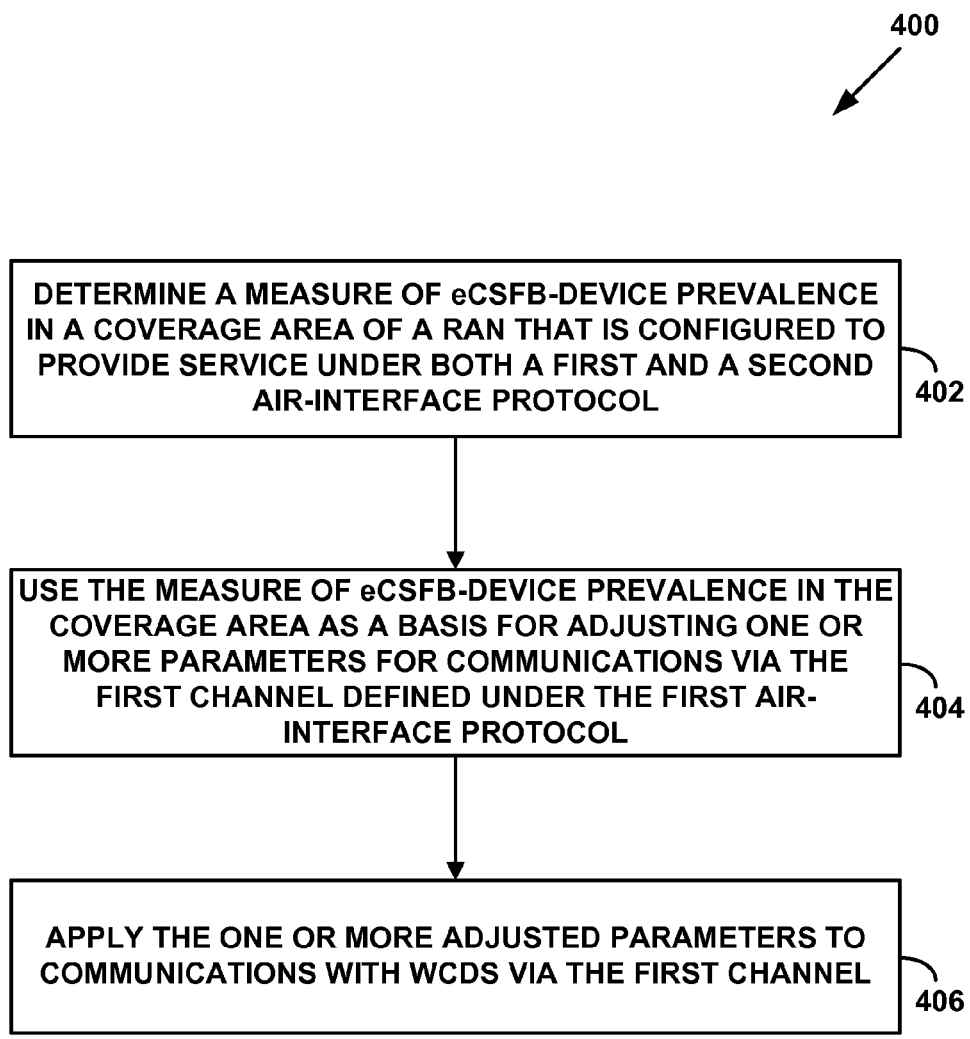
FIG. 4 is a flow chart illustrating a method, according to an exemplary embodiment.

FIG. 4 is a flow chart illustrating a method 400, according to an exemplary embodiment. Method 400 may be implemented by a component or components of a RAN, such as by a base station and/or by a switch. Herein, method 400 is described as being implemented by a base station or base stations in a RAN (e.g., by a BTS, BTS/BSC combination, or an eNodeB). However, other implementations are possible. Further, method 400 may be implemented in a RAN that is configured to provide service under both a first and a second air-interface protocol (e.g., under both a CDMA protocol, such as IS-2000 and/or IS-856, and under a 4G data protocol such as LTE and/or WiMAX).

Further, a RAN that implements method 400 may be configured to communicate with non-eCSFB wireless communication devices (WCDs) via a first channel defined under the first air-interface protocol and to communicate with eCSFB WCDs via a second channel defined under the second air-interface protocol. For instance, the RAN may use a first paging channel defined under the first air-interface protocol (e.g., a CDMA paging channel) to send paging-channel messages to non-CSFB devices. To send paging-channel messages to CSFB devices, however, the RAN may instead use a second paging channel defined under the second air-interface protocol (e.g., an LTE paging channel).

Additionally or alternatively, the RAN may use a first access channel defined under the first air-interface protocol (e.g., a CDMA access channel) for access-channel communications with non-CSFB devices, and instead use a second paging channel defined under the second air-interface protocol (e.g., an LTE access channel) for access-channel communications with CSFB devices.

As shown by block 402, method 400 may involves a base station determining a measure of CSFB-device prevalence in a coverage area (e.g., a sector or sectors that are served by the base station). Further, the base station uses the measure of CSFB-device prevalence in the coverage area as a basis for adjusting one or more parameters for communications via the first channel defined under the first air-interface protocol, as shown by block 404. The base station may then apply the one or more adjusted parameters to communications with WCDs via the first channel, as shown by block 406.

IV. DETERMINING THE ECSFB-DEVICE PRESENCE IN A COVERAGE AREA

At block 402 of method 400, a base station may determine the measure of CSFB-device prevalence in various ways, depending upon the particular implementation. Generally, the measure of CSFB-device prevalence in a given coverage area may be a quantitative indication of how prevalent CSFB-devices have been, how prevalent CSFB-devices currently are, and/or how prevalent CSFB-devices are scheduled to be and/or expected to be, in the given coverage area. Further, the measure of CSFB-device prevalence in a given coverage area may be based only on the devices capable of CSFB, only on the devices capable of eCSFB, or on devices that are capable of CSFB, eCSFB, or both.

In some embodiments, the measure of CSFB-device prevalence in a coverage area may be the number of CSFB devices that are associated with the coverage area. In such an embodiment, the base station may determine the measure of CSFB-device prevalence by determining how many CSFB devices are currently registered in a given sector that is served by the base station. In particular, when a WCD registers with the RAN in a given sector, the WCD may include, in its registration message, an indication as to whether it is capable of CSFB and/or eCSFB. This information may be stored by the RAN in a database, such that the information can be accessed to determine how many CSFB devices are registered in a given sector.

Further, in some embodiments, the measure of CSFB-device prevalence may be calculated to be equal to, or otherwise based upon, the percentage of all the devices associated with the coverage area that are CSFB devices. For example, the RAN may determine the measure of CSFB-device prevalence by determining the number of CSFB devices that are currently registered in the coverage area, and the total number of devices (both eCSFB and non-CSFB) that are currently registered in the coverage area. The RAN may then determine the percentage of all devices that are eCSFB-compatible by dividing the current number of CSFB devices by the total number of devices that are currently registered in the coverage area.

Additionally or alternatively, the RAN could determine the measure of CSFB-device prevalence based on historical prevalence of CSFB-devices in a coverage area. For example, CSFB-device prevalence may be determined based on the average number of CSFB-devices that operate in the coverage area at a given point in time. More specifically, the RAN may periodically or from time-to-time determine how many CSFB devices are currently registered in the coverage area, and maintain a database of this information. The RAN may then calculate CSFB-device prevalence to be equal to, or to be otherwise based on, the average number of CSFB devices that are registered in the coverage area at a given point in time. The average may be determined over all time, or may be determined as a moving average over a certain period of time.

As another example, CSFB-device prevalence in a given coverage area may be based on the historical percentage of devices in the coverage area that are eCSFB-compatible. For instance, the RAN may include or have access to a database that includes historical records indicating whether or not devices that register in a given coverage area are eCSFB-compatible (e.g., whether or not each device that registers is configured for communications under both LTE and a CDMA protocol). The RAN may then access this data to calculate CSFB-device prevalence by, e.g., determining the historical percentage of the devices that register in a given coverage area that are eCSFB-compatible. This historical percentage may be determined over all time or over a predetermined window of time (e.g., by determining the percentage of devices that are eCSFB-compatible over the last hour, the last day, the last week, etc.).

It should be understood that the above-described techniques for determining a measure of CSFB-device prevalence in a coverage area are provided for illustrative purposes, and are not intended to be limiting. Other measures of CSFB-device prevalence, and other techniques for determining such measures, are also possible.

V. DETERMINING PARAMETERS FOR CDMA PAGING-CHANNEL MESSAGES BASED ON CSFB-DEVICE PREVALENCE

As noted above, a RAN that implements method 400 may use a first paging channel to send paging-channel messages to non-CSFB devices, and instead use a second paging channel to send paging-channel messages to CSFB devices. For instance, a base station may use the LTE paging channel for both CDMA and LTE paging to CSFB devices. However since non-CSFB device may not be capable of communications under LTE (or, if configured for LTE communications, may not know to listen to the LTE paging channel for CDMA pages), the base station may use a CDMA paging channel for CDMA paging to non-CSFB devices.

In such a configuration, block 404 may involve the RAN determining one or more paging parameters for paging-channel messages sent via the first paging channel. Such paging parameters may include, but are not limited to: (a) the concatenation level to be used for paging-channel messages, (b) a maximum-attempt parameter for a coverage area, which specifies a maximum number of attempts to send the page that can be made in the coverage area, and/or (c) a duration of a page-attempt timer for re-transmission of pages in the coverage area, among other possibilities. Other paging parameters may also be determined based on CSFB-device prevalence, without departing from the scope of the invention.

A. Adjusting the Concatenation Level

At block 404 of method 400, a base station may determine a concatenation level to be used for paging-channel messages sent via the first paging channel (e.g., via the CDMA paging channel), based at least in part on the measure of CSFB-device prevalence that was determined at block 402. For instance, in an exemplary embodiment, a concatenation level may be selected such that less concatenation is applied to paging-channel messages when the eCSFB-WCD prevalence is higher, while comparatively more concatenation is applied to paging-channel messages when the eCSFB-WCD prevalence is lower. In such an embodiment, a base station may attempt to increase the PSR via when the number and/or percentage of WCDs that are eCSFB-compatible is higher and there is likely to be more bandwidth available on the CDMA paging channel by reducing the amount of concatenation (or possibly turning off concatenation altogether).

As a specific example, the selection of a concatenation level may involve a base station determining whether or not the eCSFB-WCD prevalence in a sector is greater than a predetermined threshold. Then, if the eCSFB-WCD prevalence is greater than the threshold, the base station may select a concatenation level such that page messages of the first type are not concatenated (or are concatenated by a lesser amount than when the eCSFB-WCD prevalence is below the threshold). On the other hand, if the eCSFB-WCD prevalence is less than the threshold, the base station may select a higher concatenation level. In some embodiments, this may simply involve turning on and off a concatenation feature for paging-channel messages sent via the CDMA paging channel in a given sector, depending upon whether the eCSFB-WCD prevalence in the sector is less than or greater than the threshold.

Figure 5:
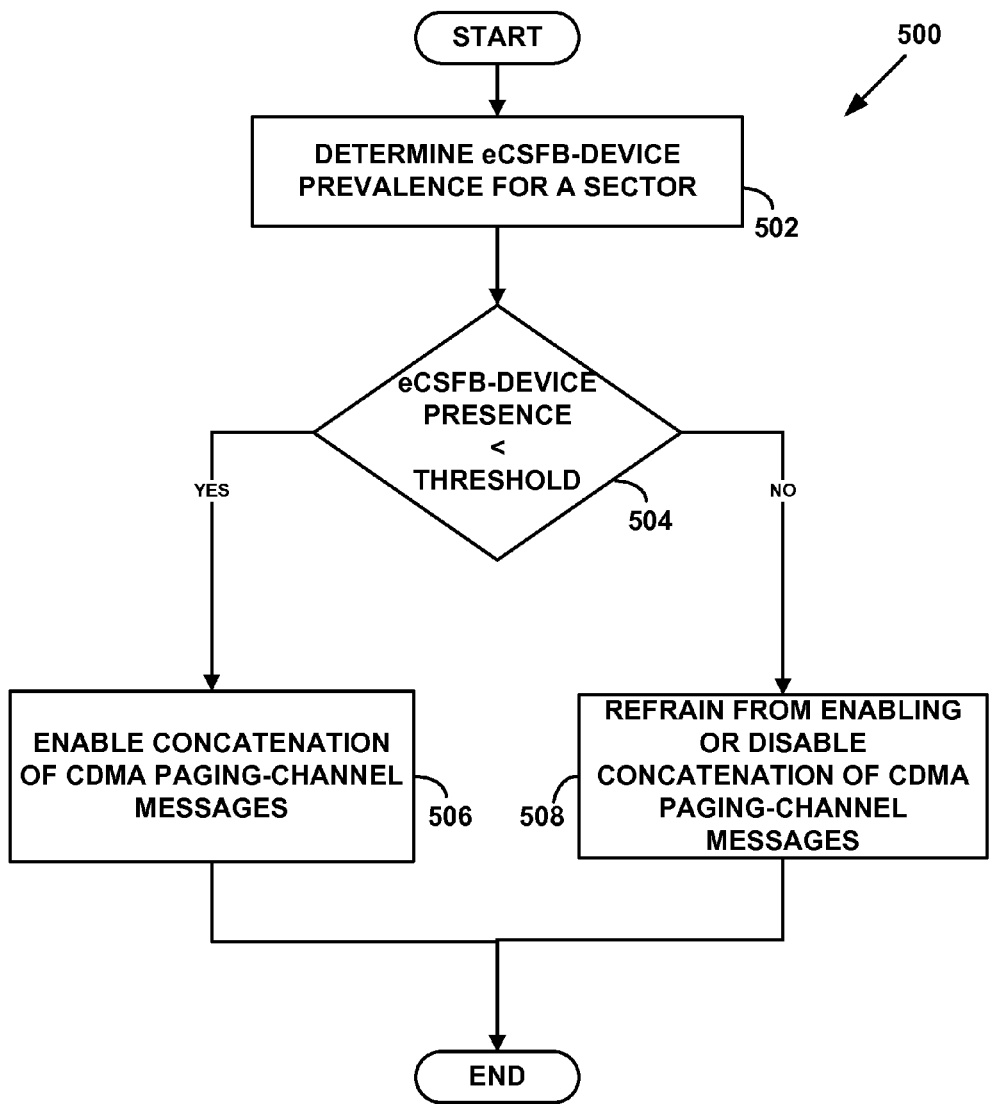
FIG. 5 is a flow chart illustrating a method for helping to more-efficiently utilize CDMA paging-channel resources, according to an exemplary embodiment.

For example, FIG. 5 is a flow chart illustrating a method 500 for helping to more-efficiently utilize CDMA paging-channel resources, according to an exemplary embodiment. Method 500 is an embodiment of method 300 in which a base station may dynamically enable and disable a concatenation feature for CDMA paging in a given sector, depending upon the prevalence of CSFB devices in the sector.

In particular, method 500 involves a base station determining the CSFB-device prevalence for a given sector, as shown by block 502. Then, the base station compares the determined CSFB-device prevalence to a threshold, as shown by block 504. If determined the CSFB-device prevalence is below the threshold, then the base station concatenates CDMA paging-channel messages in the sector (e.g., by enabling a concatenation feature), as shown by block 506. On the other hand, if the determined CSFB-device prevalence is above the threshold PCO, then the base station refrains from concatenating CDMA paging-channel messages in the sector (e.g., does not enable, or disables, the concatenation feature), as shown by block 508.

Further, in an exemplary embodiment, method 500 may be repeated periodically so as to dynamically enable and disable concatenation of pages. Yet further, method 500 may be performed for each sector served by the base station. Even further, the threshold to which the CSFB-device prevalence of a given sector is compared may differ from sector to sector (including between sectors that are served by the same base station), depending upon the particular implementation.

In some embodiments, a base station may implement a more granular selection of the concatenation level than that of method 500. For example, multiple ranges of eCSFB-WCD prevalence may be defined, such that selection may be made from between multiple concatenation levels. In particular, some implementations of method 500 may involve a base station selecting from between three or more possible concatenation levels.

B. Adjusting the Maximum Number of Page Attempts

Referring again to FIG. 4, at block 404 of method 400, a base station may adjust other paging parameters of a coverage area, in addition or in the alternative to the concatenation level. For example, a base station may determine and set a maximum-attempt parameter for a coverage area based on the CSFB-device prevalence in the coverage area. As noted above, the maximum-attempt parameter for a coverage area specifies the maximum number of attempts that can be made to send a given page. Accordingly, a base station may generally increase the value of the maximum-attempt parameter for CDMA paging-channel messages, as the CSFB-device prevalence in the coverage area increases, and vice versa.

C. Adjusting the Page-Attempt Timer

As another example, at block 404, the RAN may determine and set the duration of the page-attempt timer for a coverage area based on the CSFB-device prevalence in the coverage area. As noted above, the duration of the page-attempt timer indicates a time to wait between successive attempts to send a given CDMA paging-channel message to a given WCD. Accordingly, a base station may generally reduce the duration of the page-attempt timer as the CSFB-device prevalence in the coverage area increases, and vice versa.

It should be understood that the above ways in which CDMA paging may be adjusted based on CSFB-device prevalence are provided for purposes of illustration and are not intended to be limiting. Other adjustments to CDMA paging are possible.

VI. ADJUSTING PARAMETERS FOR ACCESS-CHANNEL COMMUNICATIONS BASED ON CSFB-DEVICE PREVALENCE

As noted above, a RAN that implements method 500 may use a first access channel for access-channel communications with non-CSFB devices, and use a second access channel for access-channel communications with CSFB devices. For instance, an LTE access channel may be used for access-channel communications between a base station and CSFB devices in a coverage area, while a CDMA access channel may be used for access-channel communications between the base station and non-CSFB devices in the same coverage area.

In such a configuration, block 504 may involve a base station using the measure of CSFB-device prevalence, which was determined at block 502, to determine one or more access parameters for communications via the first access channel (e.g., via the CDMA access channel). Such access parameters may include, but are not limited to: (a) the maximum number of access probes per access-probe cycle for WCDs operating in the coverage area, (b) the maximum number of access-probe cycles for a given WCD, and/or (c) one or more transmit-power parameters for access probes. Other access parameters may additionally or alternatively be determined based on CSFB-device prevalence, without departing from the scope of the invention.

In some embodiments, a base station may set a maximum-probe parameter for a coverage area based on the prevalence of CSFB devices in the coverage area. The value of the maximum-probe parameter may indicate the maximum probe number for a given WCD operating in the coverage area. For example, a base station may increase the value of the maximum-probe parameter for a coverage area when there are a higher number or a higher percentage of CSFB devices in the coverage area, and vice versa. The base station may then send a message to WCDs in the coverage area to indicate the increased (or decreased) value of the maximum-probe parameter. By doing so, the base station may allow for non-CSFB devices to send more access probes per cycle when there CSFB devices are prevalent. The expectation is that usage of the CDMA access channel will be reduced when the percentage of CSFB devices is higher. Accordingly, increasing the maximum-probe parameter in this scenario may help to take advantage of the expected increase in available bandwidth to improve service for non-CSFB devices.

In a further aspect, a base station may set a maximum-cycle parameter for a coverage area based on the prevalence of CSFB devices in the coverage area. The value of the maximum-cycle parameter may indicate the maximum cycle number for a given WCD operating in the coverage area. For example, a base station may increase the value of the maximum-cycle parameter for a coverage area when there are a higher number or a higher percentage of CSFB devices in the coverage area, and vice versa. Other examples are also possible. In any such embodiment, the base station may then send a message or messages to WCDs in the coverage area to indicate the increased (or decreased) value of the maximum-cycle parameter.

In yet a further aspect, a base station may set a duration parameter for access-probe timers in the coverage area, based on the prevalence of CSFB devices in the coverage area. In an exemplary embodiment, the duration parameter indicates the duration for which WCDs in the coverage area should set their respective access-probe timers. The base station may then send a message or messages to WCDs in the coverage area to indicate the increased (or decreased) value of the duration parameter, so that the WCDs may set their access-probe timers accordingly. In an exemplary embodiment, a base station may decrease the value of the duration parameter when there are a higher number or a higher percentage of CSFB devices in the coverage area, and vice versa. When there are more CSFB devices in a coverage area, thus indicating greater bandwidth availability on a CDMA access channel, then non-CSFB devices may send access probes at a faster rate. While this may increase the access-channel occupancy, the increase may be offset by the decreased usage of the access channel due to the implementation of eCSFB.

Further, in some embodiments, a base station may determine an adjustment to the initial transmit for a given WCD, based on the prevalence of CSFB devices in the coverage area. For example, when there are a higher or lower number (or a higher or lower percentage) of CSFB devices in a coverage area, a base station may send a message (e.g., a system parameters message) to a WCD in the coverage area, which indicates that the WCD should increase or decrease its initial transmit power, respectively. As a specific example, a base station may indicate to a WCD that it should determine its initial transmit power as it otherwise would, and then multiply the determined value by some factor. For instance, the base station might indicate that the WCD should multiply the initial transmit power by 1.2 in order to increase the initial transmit power, or indicate that the WCD should multiply the initial transmit power by 0.8 in order to decrease the initial transmit power. Other examples are also possible.

Yet further, in some embodiments, a base station may determine a probe-power-increase parameter based on the prevalence of CSFB devices in the coverage area. In an exemplary embodiment, the probe-power-increase parameter indicates probe-power increase amount by which a WCD should increase the transmit power upon each successive attempt in an access-probe cycle. For example, when there are a higher or lower number or percentage of CSFB devices in a coverage area, a base station may send a message to a WCD in the coverage area indicating that the WCD should increase or decrease the rate at which it increases the transmit power between successive access probes in an access-probe cycle. Other examples are also possible.

VII. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A computer-implemented method comprising:
   a radio access network (RAN) determining a measure of circuit switch fallback (CSFB) device prevalence in a coverage area, wherein the RAN is configured to use a first channel defined under a first air-interface protocol for a given type of communication with non-CSFB devices, and wherein the RAN is further configured to use a second channel defined under a second air-interface protocol for the given type of communication with CSFB devices;
   using the measure of CSFB-device prevalence in the coverage area as a basis for adjusting one or more parameters for communications via the first channel; and
   applying the one or more adjusted parameters to communications with devices via the first channel.

2. The method of claim 1, wherein the first air-interface protocol comprises a CDMA protocol, and wherein the second air-interface protocol comprises a Long-Term Evolution (LTE) protocol.

3. The method of claim 1, wherein the measure of CSFB-device prevalence comprises a number of CSFB devices that are associated with the coverage area.

4. The method of claim 1, wherein the measure of CSFB-device prevalence comprises a percentage of devices associated with the coverage area, which are CSFB devices.

5. The method of claim 1, wherein the first channel comprises a first paging channel defined under the first air-interface protocol, and wherein the second channel comprises a second paging channel defined under the second air-interface protocol, and wherein the one or more parameters for communications with via the first channel comprise one or more paging parameters for paging-channel messages sent via the first paging channel.

6. The method of claim 5, wherein said adjusting the one or more paging parameters for paging-channel messages sent via the first paging channel comprises adjusting a concatenation level to be used for paging-channel messages sent via the first paging channel.

7. The method of claim 5, wherein said adjusting the one or more paging parameters for paging-channel messages sent via the first paging channel comprises setting a maximum-attempt parameter for the coverage area.

8. The method of claim 5, wherein said adjusting the one or more paging parameters for paging-channel messages sent via the first paging channel comprises setting a duration of a page-attempt timer for the coverage area.

9. The method of claim 5, wherein said using the measure of CSFB-device prevalence in the coverage area as a basis for adjusting one or more paging parameters for paging-channel messages sent via the first paging channel comprises:
   if the measure of CSFB-device prevalence is less than a threshold, then adjusting the one or more paging parameters according to a first paging scheme; and
   if the measure of CSFB-device prevalence is greater than a threshold, then adjusting the one or more paging parameters according to a second paging scheme, wherein the second paging scheme increases the likelihood of successfully paging a device as compared to the first paging scheme.

10. The method of claim 1, wherein the first channel comprises a first access channel defined under the first air-interface protocol, and wherein the second channel comprises a second access channel defined under the second air-interface protocol, and wherein the one or more parameters for communications with via the first channel comprise one or more access parameters for communications via the first access channel.

11. The method of claim 10, wherein said adjusting the one or more access parameters for communications via the first access channel comprises:
   determining a maximum number of access probes per access-probe cycle in the coverage area; and
   setting a maximum-probe-number parameter to the determined maximum number.

12. The method of claim 10, wherein said adjusting the one or more access parameters for communications via the first access channel comprises:
   determining a maximum number of access-probe cycles for a given device operating in the coverage area; and
   setting a maximum-cycle-number parameter to the determined maximum number.

13. The method of claim 10, wherein said adjusting the one or more access parameters for communications via the first access channel comprises determining a duration of an access-probe timer for the coverage area.

14. The method of claim 10, wherein said adjusting the one or more access parameters for communications via the first access channel comprises determining one or more transmit-power parameters for access probes in the coverage area.

15. The method of claim 14, wherein said determining one or more transmit-power parameters for access probes in the coverage area comprises one or more of: (a) determining an initial transmit power for the coverage area, and (b) determining a probe-power-increase amount for the coverage area.

16. A non-transitory computer readable medium having stored therein instructions that are executable to cause at least one component of a radio access network (RAN) to perform functions comprising:
   determining a measure of circuit switch fallback (CSFB) device prevalence in a coverage area, wherein the RAN is configured to use a first channel defined under a first air-interface protocol for a given type of communication with non-CSFB devices, and wherein the RAN is further configured to use a second channel defined under a second air-interface protocol for the given type of communication with CSFB devices;
   using the measure of CSFB-device prevalence in the coverage area as a basis for adjusting one or more parameters for communications via the first channel; and applying the one or more adjusted parameters to communications with devices via the first channel that is defined under the first air-interface protocol.

17. The computer readable medium of claim 16, wherein the first air-interface protocol comprises a CDMA protocol, and wherein the second air-interface protocol comprises a Long-Term Evolution (LTE) protocol.

18. The computer readable medium of claim 16, wherein the first channel comprises a first paging channel defined under the first air-interface protocol, and wherein the second channel comprises a second paging channel defined under the second air-interface protocol, and wherein the one or more parameters for communications with via the first channel comprise one or more paging parameters for paging-channel messages sent via the first paging channel.

19. The computer readable medium of claim 16, wherein the first channel comprises a first access channel defined under the first air-interface protocol, and wherein the second channel comprises a second access channel defined under the second air-interface protocol, and wherein the one or more parameters for communications with via the first channel comprise one or more access parameters for communications via the first access channel.

20. A radio-access-network component comprising:
a non-transitory computer readable medium;
program instructions stored on the non-transitory computer readable medium an executable by at least one processor to:
(a) determine a measure of circuit switch fallback (CSFB) device prevalence in a coverage area, wherein the RAN is configured to use a first channel defined under a first air-interface protocol for a given type of communication with non-CSFB devices, and wherein the RAN is further configured to use a second channel defined under a second air-interface protocol for the given type of communication with CSFB devices;
(b) use the measure of CSFB-device prevalence in the coverage area as a basis to adjust one or more parameters for communications via the first channel; and
(c) apply the one or more adjusted parameters to communications with devices via the first channel that is defined under the first air-interface protocol.

21. The radio-access-network component of claim 20, wherein the first air-interface protocol comprises a CDMA protocol, and wherein the second air-interface protocol comprises a Long-Term Evolution (LTE) protocol.

22. The radio-access-network component of claim 20, wherein the first channel comprises a first paging channel defined under the first air-interface protocol, and wherein the second channel comprises a second paging channel defined under the second air-interface protocol, and wherein the one or more parameters for communications with via the first channel comprise one or more paging parameters for paging-channel messages sent via the first paging channel.

23. The radio-access-network component of claim 20, wherein the first channel comprises a first access channel defined under the first air-interface protocol, and wherein the second channel comprises a second access channel defined under the second air-interface protocol, and wherein the one or more parameters for communications with via the first channel comprise one or more access parameters for communications via the first access channel.

24. The radio-access-network component of claim 20, wherein the radio-access-network component is a base station.

25. A computer-implemented method comprising:
a radio access network (RAN) determining a measure of enhanced circuit switch fallback (eCSFB) device prevalence in a coverage area, wherein the RAN is configured to use a first channel defined under a first air-interface protocol for a given type of communication with non-eCSFB devices, and wherein the RAN is further configured to use a second channel defined under a second air-interface protocol for the given type of communication with eCSFB devices;
using the measure of eCSFB-device prevalence in the coverage area as a basis for adjusting one or more parameters for communications via the first channel; and
applying the one or more adjusted parameters to communications with devices via the first channel.

* * * * *